Nov. 27, 1951  H. L. BARNEY  2,576,249
LEVEL RATIO MEASURING SYSTEM
Filed Aug. 28, 1947  3 Sheets-Sheet 1
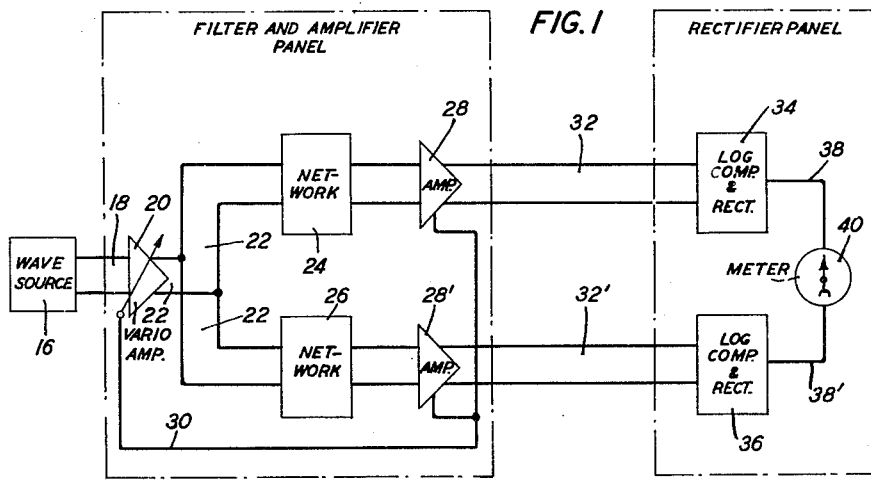
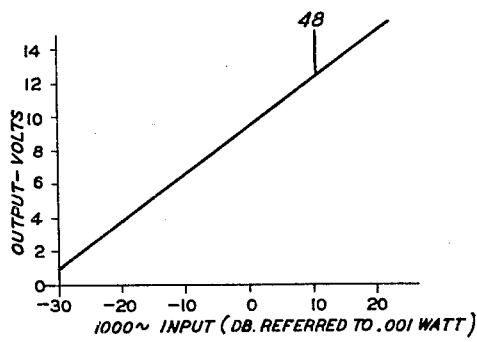
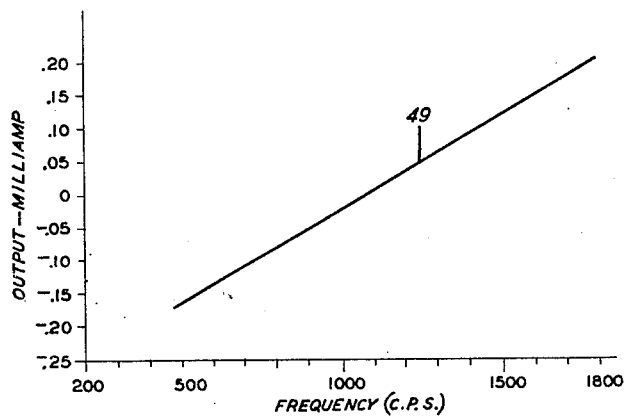
INVENTOR
H. L. BARNEY
BY
Robert J. Pluskey
ATTORNEY

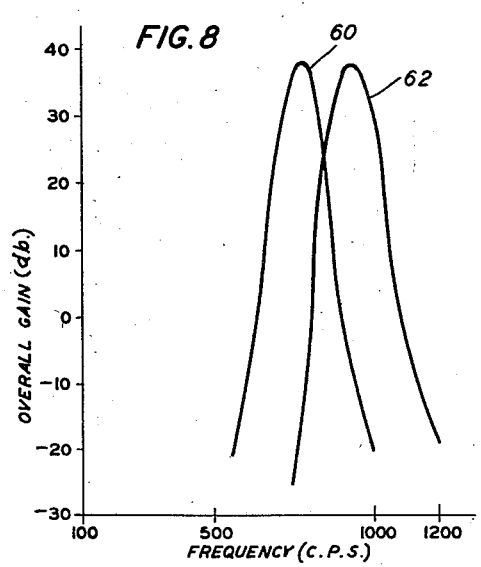
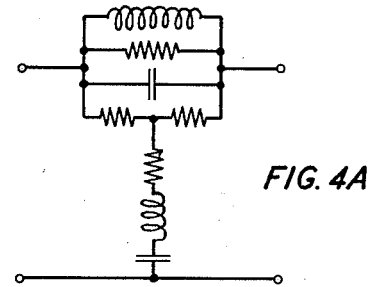
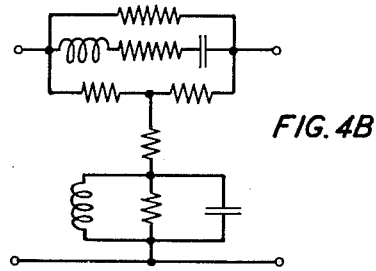
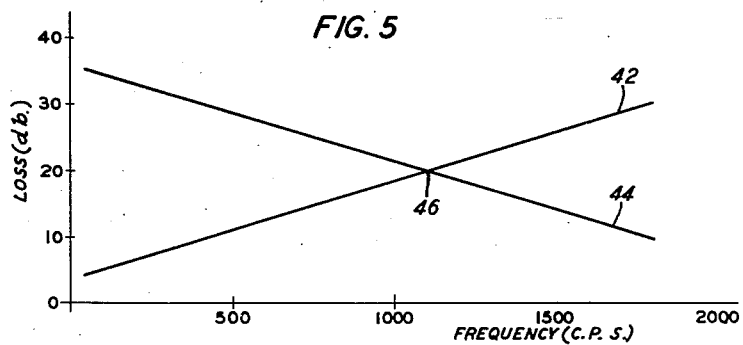
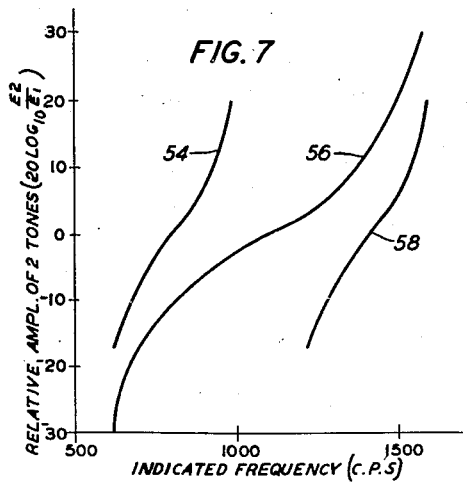
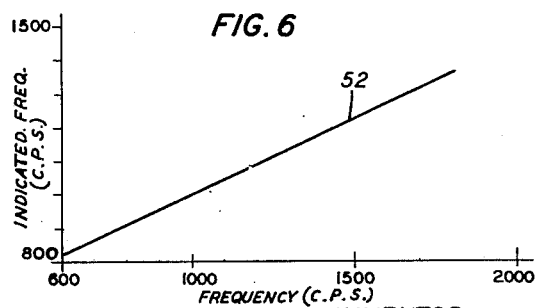

Nov. 27, 1951         H. L. BARNEY         2,576,249

LEVEL RATIO MEASURING SYSTEM

Filed Aug. 28, 1947         3 Sheets-Sheet 3

INVENTOR
H. L. BARNEY
BY
Robert J. Fluckey
ATTORNEY

Patented Nov. 27, 1951

2,576,249

UNITED STATES PATENT OFFICE 2,576,249

LEVEL RATIO MEASURING SYSTEM

Harold L. Barney, Madison, N. J., assignor to Bell Telephone Laboratories, Incorporated, New York, N. Y., a corporation of New York Application August 28, 1947, Serial No. 770,980

4 Claims. (Cl. 175—183)

This invention relates to electric wave measuring apparatus, and more particularly to such apparatus when arranged to detect relative changes in the characteristics of electric waves or selected components of such waves.

In various branches of the electric wave transmission art it is frequently desirable to compare certain characteristics of electric waves, or selected components of such waves, in such manner that the comparison is independent of changes in the magnitude of the compared characteristics, so long as the ratio of the magnitudes is not changed.

It is accordingly an object of the invention to detect relative changes in the compared characteristic of electric waves without regard to the actual magnitudes of the compared characteristics over a wide range of magnitudes.

In one form the invention may be employed as a detector of frequency changes in an electric wave, the frequency of which is varied in accordance with a modulating signal, and the amplitude of which may vary over a wide range.

In another form the invention may be employed to give a direct determination of the relative changes in the transmission equivalents of separate transmission paths, or in the levels of discrete electric waves utilizing a common transmission path.

Additionally, the invention makes possible a direct and instantaneous consideration of the magnitudes and frequencies of a combined group of electric wave components to indicate a weighted average frequency of the principal components.

The manner in which the invention may be utilized to accomplish the foregoing may best be understood from a consideration of the following description with reference to the accompanying drawings in which:

Fig. 1 is a block schematic illustration of a measuring system embodying the invention;

Fig. 2 is a graphical representation of the transmission characteristic of one of the logarithmic compressor-rectifier units of the invention;

Fig. 3 is a graph showing the linear operation of the invention when incorporated into a frequency sensitive measuring system;

Figs. 4A and 4B are schematic diagrams of input equalizers that may be used in practicing one form of the invention;

Fig. 5 is a graphical representation of the transmission characteristics of the equalizers of Figs. 4A and 4B;

Figs. 6 and 7 are graphical indications of operating characteristics of a described embodiment of the invention;

Fig. 8 is a graphical representation of the transmission characteristic of input networks that may be used in a described alternative embodiment.

Figure 9:
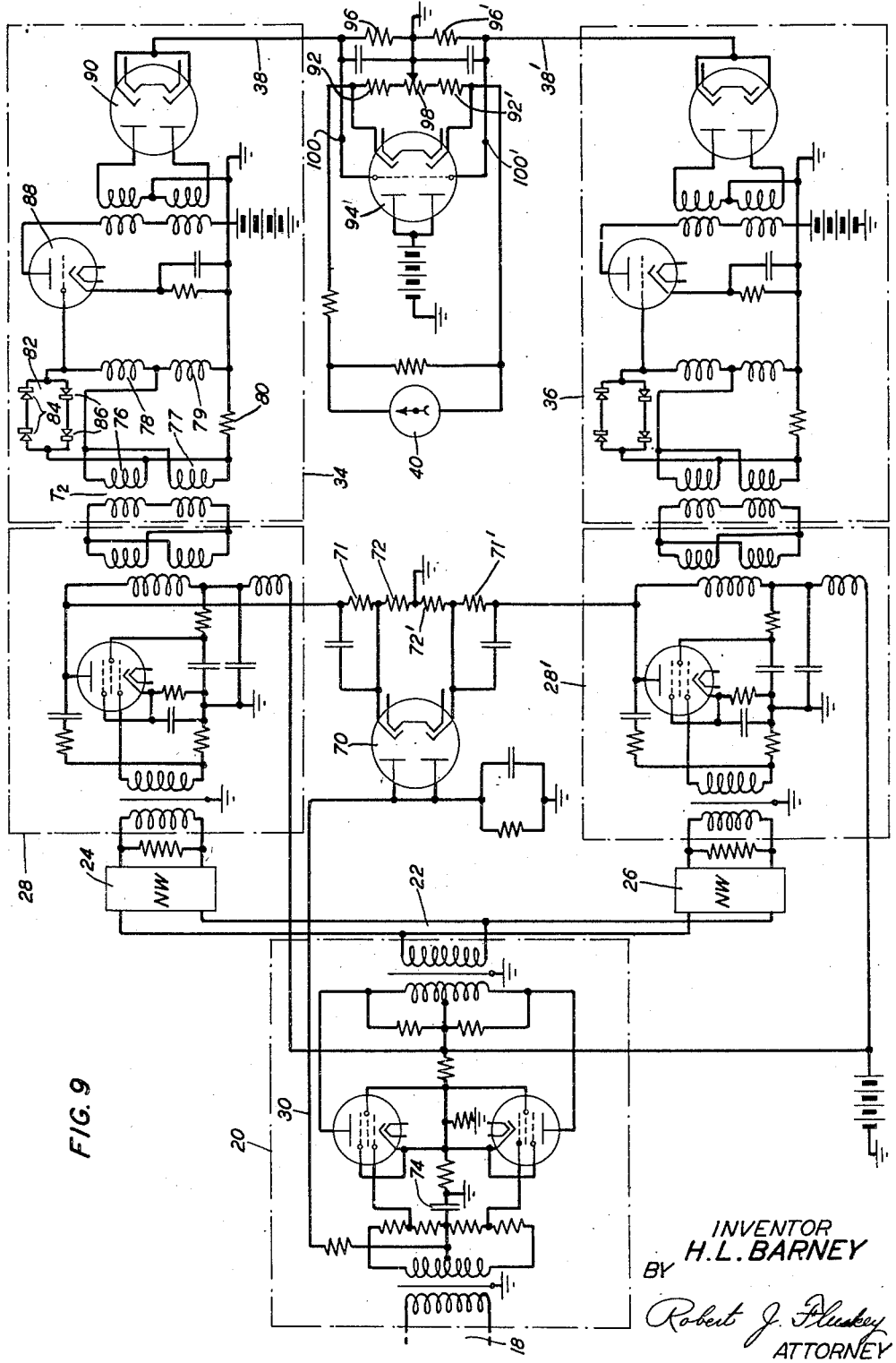
Fig. 9 is a schematic diagram showing circuit details of the measuring system of Fig. 1.

Referring to Fig. 1, there is shown in block diagrammatic form an embodiment of the invention such as might be used for the detection of frequency modulated waves, or for indicating the spectrum location of the predominant components of a complex wave, such, for example, as a speech wave.

Assume, for purposes of illustration, that a variable frequency electric wave, such as a frequency modulated wave, is supplied by the wave source 16 over the interconnecting circuit 18 to the variable gain amplifier 20, where it is amplified to an output level, as controlled by the channel amplifiers 28, 28' over the backward acting gain control channel 30. By way of interconnecting circuit 22 this amplified wave is supplied to the input terminals of the networks 24, 26 in the upper and lower system branches, respectively. These networks, may take the form of those schematically indicated in Figs. 4A and 4B which have complementary transmission characteristics as indicated by the curves 42, 44 (Fig. 5). Curve 42 indicates the loss-frequency characteristic of the upper branch network 24 in which the attenuation increases linearly with frequency. Curve 44 indicates similar data for the lower branch network 26 wherein the attenuation varies as an inverse linear function of the frequency. By inspection of curves 42, 44 it is apparent that at only one point 46, corresponding in this example to a frequency of about 1,100 cycles per second, is the attenuation equal in the two networks for any given frequency of the input wave. For any other frequency the attenuation will be unequal in the two networks, with the result that there will exist a difference in the amplitudes of the upper and lower branches of the signal wave. The system branch, upper or lower, in which the signal wave has the greater amplitude, and the amount by which it exceeds the other, will be determined by the frequency of the applied signal.

At this point it should be noted that although the networks 24, 26 have imparted a characteristic difference to the transmission levels of the two portions of the signal wave, they have not imparted any particular absolute level to these portions. Therefore if for any reason the level of the signal wave is varied in the interconnecting circuit 22 the actual voltage difference in the amplitude of the signal wave portions, as observed at the output of the networks 24, 26 will be correspondingly varied. Any system using voltage indicating means for accurately measuring level differences in these wave portions must then compensate for this change in level, or must measure these differences in a manner that is independent of this level change. In accordance with the invention, this described embodiment accomplishes this result by the latter method in the following manner.

By way of interconnecting circuits 32, 32', the variously attenuated signal wave portions are delivered to the logarithmic compressor and rectifier units 34, 36 wherein the signal wave is attenuated as a logarithmic function of its input voltage amplitude, and is rectified in a unidirectional conducting unit having a linearly related input-output voltage characteristic. The details of the logarithmic compressor portion of this unit will be described in connection with the description of Fig. 9. The transmission characteristic of such a unit is indicated by the curve 48 of Fig. 2 which shows the linear variation in the rectifier voltage output as the alternating input voltage is varied logarithmically over a range of about 45 decibels. The indicating means, or meter 40, is differentially connected between the outputs of the logarithmic compressor and rectifier units 34, 36 in such manner that the rectified output voltages are subtracted and the difference may be indicated on the meter 40 as cycles per second. If desired, the indicating means 40 may be dispensed with, and variations in the differential voltage output of the units 34, 36 may be used directly as the desired signal frequency. Such an arrangement might be desirable in the detection of frequency modulated radio waves as it makes unnecessary the usual limiting operation preceding the detector unit. The linear relationship existing between this output, measured in this example as milliamperes, and the frequency of the input signal, as expressed in cycles per second, is shown by the curve 49 of Fig. 3. This measured linear relationship extends over approximately two octaves from about 350 to 1,800 cycles per second, and is insensitive to variation in the amplitude of the input signal over a wide range of values. The exact range of permissible amplitude variations will depend upon the difference in the levels of the compared components.

That this output signal is insensitive to variations in the amplitude of the input signal may be seen from the following considerations. It will be recalled that amplitude variations in the input signal in the interconnecting circuit 22 cause corresponding fluctuations in the signals applied to the two logarithmic compressor-rectifiers 34, 36, and in consequence the ratio of the voltages applied to these units remains unchanged. This is true since the networks 24, 26 have complementary linear characteristics. If the voltages at the input of compressors 34, 36 are $E_1$ and $E_2$, respectively, the rectified voltages at the output of these units will be $K_1 \log E_1 + K_2$ and $K_1 \log E_2 + K_2$, respectively, where $K_1$ and $K_2$ are constants determined by circuit design. These output voltages are differentially added such that their net voltage is equal to $$(K_1 \log E_1 + K_2) - (K_1 \log E_2 + K_2)$$

which is equal to $$K_1 \log \frac{E_1}{E_2}$$

Therefore if $E_1$ and $E_2$ are varied by an equal number of decibels, which would be the case for a voltage variation in the applied signal, the ratio $$\frac{E_1}{E_2}$$

remains unchanged, and the net voltage $$K_1 \log \frac{E_1}{E_2}$$

available at the output of the rectifiers of units 34, 36, as indicated by the meter 40, remains unchanged.

If, instead of a single frequency modulated wave, the input signal consists of a complex wave comprising two, or more, waves of different frequencies, the frequency indicated on the meter 40 will be a weighted function of the amplitudes and frequencies of the component waves. Consider the Fig. 1 circuit, including input networks 24, 26 as described. When two equally strong single frequency waves are simultaneously applied, the indicated frequency will be the arithmetic mean of the applied frequencies. Consider the circumstances that bring about this relation. Refer to the two loss-frequency characteristic curves 42, 44 of Fig. 5, and assume two equally strong signals having frequencies $f_1$ and $f_2$ to be applied to each network. The voltages corresponding to these frequencies at the outputs of the networks 24, 26 will be, respectively, $E'_a$ and $E''_a$ for network 24 and $E'_b$ and $E''_b$ for network 26. If $f_1$ is assumed to be the lower of the two frequencies, $E'_a$ will be greater than $E''_a$ by a sum arbitrarily indicated as $2n$ decibels. Similarly in the lower branch, $E''_b$ will be greater than $E'_b$ by the same $2n$ decibels sum, since the slopes of the two network characteristics are complementary. The resulting upper branch voltage will be equal to the voltage $E'_a$ multiplied by some circuit constant $K_1$. In the lower branch, the resulting voltage will be equal to the voltage $E''_b$ multiplied by the same constant $K_1$. The ratio of the upper branch and lower branch resultant voltages may be expressed as $$R = \frac{K_1 E'_a}{K_1 E''_b}$$

or simply $$\frac{E'_a}{E''_b}$$

which is the same ratio as is observed in the case of a single frequency tone having a frequency equal to $$\frac{f_1 + f_2}{2}$$

The observed frequency indications for various conditions of applied input signal voltages are shown by the curves of Figs. 6 and 7. With reference to Fig. 6, curve 52 shows the frequency indication observed on the meter 40 when two equal amplitude tones of different frequencies were supplied to the input circuit 22. In compiling this data, one tone was fixed in frequency at 1,000 cycles per second while the other was varied from a minimum of 600 to a maximum of 1,800 cycles per second. Referring to Fig. 7 curves 54, 56 and 58 show the indicated frequency in cycles per second, as read on meter 40, when two tones of varying relative amplitudes are supplied to the input circuit 22. Curve 54 illustrates this action when varying relative amplitudes of signals having frequencies of 600 and 1,000 cycles per second were used. Curve 56 indicates similar data for signals of 600 and 1,600 cycles per second, whereas frequencies of 1,200 and 1,600 cycles per second were used in compiling the data for curve 58.

Now, if instead of the previously described networks 24, 26 having complementary linear loss-frequency characteristics there are substituted networks having a characteristic whereby a linearly varying loss in decibels is related to the logarithm of the input frequency, and these characteristics are in complementary relation, then the indicated frequency for an input signal consisting of two equal amplitude frequencies $f_1$ and $f_2$ will be the geometrical mean frequency $\sqrt{f_1 f_2}$. Various other network characteristics may be used in complementary relation to control the indicated frequency. However, in all cases the indicated frequency is independent of amplitude variations in the applied signal or signals so long as the voltage ratio at the input of the compressor units 34, 36 remains unchanged.

From the foregoing it may be seen that the invention may be utilized in an arrangement in which the input networks may take the form of two band-pass filters having any suitable pass bands, for example, such as those indicated by the attenuation-frequency characteristic curves 60, 62 of Fig. 8. This structure may be used when it is desirable to measure the actual level difference, or the variations in this level difference, as expressed in decibels between two independently varying signals, or bands of signals, of different frequencies. By constructing the band-pass filters in accordance with well-known design considerations such that they each accept a band of frequencies covering those portions of the spectrum under observation, the previously described circuit arrangement may be adapted to indicate these level variations when the indicating means, or meter 40, is calibrated in decibels above and below a center scale reading equivalent to zero decibels level difference. As previously indicated, any indicated level difference will remain unchanged during amplitude variations in the applied signal, which changes are of a nature not to change the ratio of the applied signal voltages or powers.

The detailed circuit configuration of the electrical measuring system of Fig. 1 is illustrated in Fig. 9, in which electric waves from a signal source (not shown) are applied by way of the input circuit 18 to the variable amplifier 20. The gain of this amplifier is adjustable over a suitable range and is intended to maintain the level of the signal, or signals, to be measured near the upper limit of the working range of the logarithmic compressors 34, 36. The response of this amplifier is linear for input signals below a given level. Above this level the gain is regulated by the amplitude of the larger signal as measured at the anodes of the channel amplifiers 28, 28'. The cathodes of the duplex diode 70 are connected to a point on the voltage dividing resistors 71, 72 and 71', 72' such that they are normally at any desired positive potential with respect to the conjugate anodes. As the signal in the input circuit 18 exceeds a selected level the negative portion of the signal wave in the anode circuit of one or both branch amplifiers 28, 28' exceeds this positive cathode bias, and space current flows from the ungrounded side of the variable amplifier grid condenser 74, over conductor 30 and through that anode-cathode circuit of diode 70 which corresponds to the channel amplifier having the excessive signal amplitude in its anode circuit. This action increases the negative control grid-cathode bias of the variable amplifier 20, and decreases the gain of this variable unit. The signal output from amplifier 20 is connected to the networks 24, 26 through the interconnecting circuits 22. As previously described, these networks may be band-pass filters having any suitable pass bands, such, for example, as illustrated in Fig. 8, or they may be complementary slope networks, for example, such as illustrated by Figs. 4A, 4B, and the characteristics of which may take the form illustrated in Fig. 5. The channel amplifiers 28, 28' have a fixed gain of suitable magnitude, and the voltage dividing resistors 71, 72 and 71', 72' connect their anode circuits to the cathodes of the duplex diode 70 for gain regulating purposes. The output of each channel amplifier 28, 28' is interconnected to the input of its respective logarithmic compressor-rectifier unit 34, 36. Inasmuch as these latter units are substantially identical, the specific circuit details of only the upper branch unit 34 will be here described. The alternating signal voltage from channel amplifier 28 is impressed across the primary winding of coupling transformer $T_2$. Secondary windings 76, 77 are in parallel connection, and are connected across one diagonal of the bridge circuit comprising resistor 80, coil windings 78, 79 and the parallel-path, oppositely-poled non-linear device 82, which in this described embodiment may comprise copper oxide rectifying elements 84, 86, or similar units, arranged as shown. Coil windings 78, 79, which may be derived from any suitable coil having its winding tapped at its electrical center to form two balanced branches, are included in the control grid-cathode circuit of the amplifying triode 88, thus effectively coupling this circuit to the other diagonal of the bridge. Current induced into the secondary windings 76, 77 will tend to cause current to flow through the bridge branches comprising coil 79 and resistor 80 in series, and coil 78 and the non-linear unit 82 in series. As the current flows in opposite directions in the balanced coil windings 78, 79, because of their center tap connection, the net effective current flow in these coils, and consequently the control grid bias for the triode 88 depends upon the degree of balance existing between the resistor 80 and the non-linear unit 82. The resistances of the rectifying elements 84, 86 are inversely proportional to the amplitude of the voltages impressed across them, being higher at low amplitude of impressed voltage. Therefore when the impressed signal is at a low level value, the non-linear device 82 has a resistance value greatly in excess of the value of resistor 80. In this condition the bridge is unbalanced, and a relatively large proportion of the applied signal is effective in producing a net positive control voltage on the control grid of triode 88, resulting in a specified space current in this tube, and a related rectified current flow in the double diode 90. As the amplitude of the signal output from channel amplifier 28 is increased, the effective resistance of the non-linear device 82 is lowered, and more closely approaches the value of the resistor 80, thereby tending to balance the bridge and equalize the flow of current through the coil windings 78, 79. This action reduces the proportionate part of the applied signal that is effective in producing the positive control grid bias in the triode 88. Although the space current is increased, the change is not in proportion to the change in the signal amplitude. By choosing a suitable value for the resistor 80, the amplitude of the output voltage, either alternating or direct, depending upon the point of measurement, may be compressed to a linearly varying function as the amplitude of the applied input signal is varied as a logarithmic function. In a tested embodiment utilizing the copper oxide varistors arranged as shown, a suitable value for this resistor 80 was found to be substantially 120 ohms. The exponential input-output characteristic of a logarithmic compressor rectifier unit when so constructed is illustrated by the curve 48 of Fig. 2. As previously stated, the lower branch compressor-rectifier unit 36 is substantially identical to the upper unit 34.

The rectified outputs of the upper and lower branches are differentially connected to the indicating meter 40 through the voltage producing resistors 96, 96' in the anode-cathode circuits of the linear rectifiers which are included in the respective upper and lower compressing rectifying units 34, 36. Control voltages for the control grids of the double cathode follower 94 are derived from these resistors and control the voltages delivered to the meter 40 from the cathode end of resistors 92, 92'. The tapped cathode resistor 98 is common to the anode-cathode circuits of the double triode 94, and provides a ready means for balancing the deflection of the meter 40 for signals of equal amplitude at the input of the compressing units 34, 36.

If aural indication of the frequency change is desired, such as would be used in the detection of frequency modulated radio waves, the indicating circuit may be disconnected at points 100, 100', and the input terminals of a conventional transformer coupled audio frequency reproducing system may be substituted therefor.

Although this invention has been described in connection with certain specified electrical measuring systems, and specific component values and transmission characteristics of certain elements have been referred to, these have been presented as illustrative of and not as limitations on the invention. Variations within the scope of the invention will doubtlessly occur to those skilled in this art.

What is claimed is:

1. Electric wave measuring apparatus comprising a pair of input circuits, a pair of amplitude sensitive electric networks, each of said networks comprising a Wheatstone bridge circuit including in one branch a resistive element equally responsive to alternating signals of unequal amplitudes, and in its conjugate branch an amplitude sensitive resistive element unequally responsive to alternating signals of unequal amplitudes, each of said input circuits being effectively connected across one diagonal of an individual one of said bridges, an output circuit individual to each bridge circuit and effectively coupled across the opposite conjugate diagonal of said respective bridges, each of said output circuits including a unidirectional conducting device for converting alternating voltages received from said respective bridge circuit to linearly related direct electromotive forces, differential connecting means between said unidirectional conducting devices for opposing the outputs thereof, and indicating means associated with said differential connecting means.

2. An electric wave measuring system comprising a pair of input circuits, a pair of amplitude sensitive electric networks, each one of said networks being connected to a different one of said input circuits, each one of said networks comprising a Wheatstone bridge having a linear resistance in one arm thereof, a network having two parallel branches in series with a second adjacent arm thereof, each of said parallel branches comprising at least one non-linear variable resistance, said non-linear resistances being oppositely poled with respect to one another and to said second arm, and equal impedances in the remaining two arms of said bridge, the resistance values of said linear resistance and said non-linear resistances being so proportioned as to balance said bridge when it is subjected to signals of a certain amplitude, and to progressively unbalance said bridge when it is subjected to signals of amplitudes progressively lower than said balancing amplitude, each of said input circuits being inductively connected across one pair of diagonally related bridge terminals, an output circuit effectively connected across each conjugate pair of diagonally related bridge terminals, each of said output circuits including a linear unidirectional voltage translating device, differential connecting means between said unidirectional translating devices for opposing the outputs thereof, and a utilization circuit associated with said differential connecting means.

3. An electrical measuring system in accordance with claim 2 in which each of said input circuits is connected to and serially preceded by a different one of two unidirectional amplifiers, to the input of each of which is connected a different one of two frequency sensitive selective devices, one of said selective devices presenting a relatively low, substantially uniform attenuation to electric signals within a designated band of frequencies, and a relatively high attenuation to electric signals at all other frequencies, the second of said networks presenting a relatively low, substantially uniform attenuation to electric signals within a designated different band of frequencies and a relatively high attenuation to electric signals at all other frequencies including the designated band of frequencies of said first-mentioned device, a common input transmission circuit connected to each of said selective devices, said circuit including a variable gain amplifier, and means, including a unidirectional conducting device, cooperatively associated with said variable gain amplifier and each of said unidirectional amplifiers for controlling the gain of the variable amplifier in response to changes in the amplitude of signals in the output circuits of said unidirectional amplifiers.

4. An electrical measuring system in accordance with claim 2 which includes two networks connected, respectively, in said input circuits, said last-mentioned networks having attenuation characteristics such that the attenuation in decibels varies linearly with the logarithm of the input frequency over a selected range of frequencies and said characteristics being complementary over said range.

HAROLD L. BARNEY.

REFERENCES CITED

The following references are of record in the file of this patent:

UNITED STATES PATENTS

| Number | Name | Date |
|---|---|---|
| 1,663,086 | Long | Mar. 20, 1928 |
| 1,711,101 | Shanck | Apr. 30, 1929 |
| 1,762,160 | Curtis | June 10, 1930 |
| 2,251,064 | Martin et al. | July 29, 1941 |
| 2,301,115 | Gilbert | Nov. 3, 1942 |
| 2,305,543 | McCarty | Dec. 15, 1942 |
| 2,313,666 | Peterson | Mar. 9, 1943 |
| 2,349,881 | Peterson | Mar. 30, 1944 |
| 2,352,082 | De Rosa | June 20, 1944 |
| 2,413,977 | Koch | June 7, 1947 |
| 2,429,788 | Atwood | Oct. 28, 1947 |
| 2,457,013 | Usselman | Dec. 21, 1948 |